United States Patent [19]

Linsner et al.

[11] Patent Number: 4,812,334
[45] Date of Patent: Mar. 14, 1989

[54] PROCESS FOR SEALING CERAMIC HEAT EXCHANGERS

[75] Inventors: Otmar Linsner, Ratingen; Karl Berroth, Düsseldorf, both of Fed. Rep. of Germany

[73] Assignee: Hoechst CeramTec Aktiengesellschaft, Selb, Fed. Rep. of Germany

[21] Appl. No.: 123,271

[22] Filed: Nov. 19, 1987

[30] Foreign Application Priority Data

Nov. 21, 1986 [DE] Fed. Rep. of Germany ....... 3639880
May 26, 1987 [DE] Fed. Rep. of Germany ....... 3717670

[51] Int. Cl.$^4$ ............................ B05D 3/02; B05D 3/12
[52] U.S. Cl. .................................... 427/369; 165/133; 165/134.1; 427/387
[58] Field of Search ........................... 165/133, 134.1; 427/387, 369

[56] References Cited

U.S. PATENT DOCUMENTS

| | | | |
|---|---|---|---|
| 4,122,220 | 10/1978 | Sussmuth | 427/243 |
| 4,177,230 | 12/1979 | Mazdiyasni | 264/60 |
| 4,265,302 | 5/1981 | Foerster et al. | 165/165 |
| 4,289,720 | 9/1981 | Yajima et al. | 264/63 |
| 4,362,209 | 12/1982 | Cleveland | 165/166 |
| 4,427,034 | 1/1984 | Nugata et al. | 165/133 X |
| 4,437,217 | 3/1954 | Lallaye et al. | 165/133 X |
| 4,486,476 | 12/1984 | Fritsch et al. | 427/387 |
| 4,526,635 | 7/1985 | Hienrich et al. | 156/89 |
| 4,617,072 | 10/1986 | Merz | 156/89 |
| 4,689,252 | 8/1987 | Lebrun et al. | 427/228 |

FOREIGN PATENT DOCUMENTS

| | | |
|---|---|---|
| 2019678 | 2/1971 | Fed. Rep. of Germany . |
| 2351162 | 4/1975 | Fed. Rep. of Germany . |
| 2934973 | 3/1980 | Fed. Rep. of Germany . |
| 3136253 | 3/1983 | Fed. Rep. of Germany . |
| 3312911 | 10/1984 | Fed. Rep. of Germany . |
| 3314221 | 10/1984 | Fed. Rep. of Germany . |
| 3327659 | 2/1985 | Fed. Rep. of Germany . |
| 2635167 | 6/1987 | Fed. Rep. of Germany . |
| 2707290 | 8/1987 | Fed. Rep. of Germany . |
| 2579602 | 10/1986 | France . |
| 466 | 1/1978 | Japan ............... 165/133 |
| 155853 | 8/1985 | Japan ............... 165/133 |
| 164167 | 8/1985 | Japan ............... 165/133 |
| 213757 | 10/1985 | Japan ............... 165/134.1 |
| 1284148 | 8/1972 | United Kingdom . |
| 2002738 | 2/1979 | United Kingdom . |
| WO 80/00021 | 1/1980 | World Int. Prop. O. . |

OTHER PUBLICATIONS

Chemical Abstracts, vol. 102, 102:66336v, 1985, p. 266.
Chemical Abstracts, vol. 83, 83972f, 1975.

*Primary Examiner*—Michael Lusignan
*Attorney, Agent, or Firm*—Foley & Lardner, Schwartz, Jeffery, Schwaab, Mack, Blumenthal & Evans

[57] ABSTRACT

Ceramic heat exchangers having narrow cross-sections are sealed by filling one side (which later will be the cold side) of the heat exchanger with a liquid synthetic resin and generating there a pressure higher than that on the other side (which later will be the hot side) of the heat exchanger, removing the excess resin and fully curing the synthetic resin. The process is suitable especially for ceramic heat exchangers of silicon nitride. In this case, a suspension of finely dispersed abrasive in a liquid phase can be pumped, before the treatment with the liquid synthetic resin, through that side of the heat exchanger which will later by the cold side, until the silicon nitride whiskers formed on reaction firing have been mechanically removed, and the heat exchanger can then be rinsed and dried.

11 Claims, No Drawings

PROCESS FOR SEALING CERAMIC HEAT EXCHANGERS

The present invention relates to a process for sealing heat exchangers of a porous ceramic material with narrow cross-sections.

Such heat exchangers can be produced by several processes, for example starting from an isostatically pressed ceramic green compact. In this case, several mutually parallel recesses arranged side by side are milled in from two plane-parallel sides, the recesses on one side being offset relative to the recesses of the other side by half the distance between the recesses of one side and engaging between the recesses of the opposite side. On the end faces, the recesses are sealed gas-tight by means of a ceramic compound and are covered on the plane-parallel sides by covering walls of ceramic in such a way that inflow and outflow apertures for the media remain open at least in the covered region located at the end faces. Subsequently, the green compact is fired (cf. German Auslegeschrift Pat. No. 2,707,290). Heat exchangers can also be constructed from ceramic foils, different flow channels being punched or embossed into the foil and mutually fitting foil sections then being bonded by a laminating aid. The heat exchanger block obtained is then fired in two stages. Suitable materials are, inter alia, silicon nitride, silicon carbide and cordierite (cf. German Offenlegungsschrift Pat. No. 3,136, 253). The disadvantage of these known ceramic heat exchangers is that some of the materials are porous and then do not meet stringent requirements with respect to gas-tightness and liquid-tightness. This applies especially to reaction-bonded silicon nitride (RBSN). A process has also already been disclosed for providing articles of silicon carbide, which contain free silicon, with an impermeable glazing (German Offenlegungsschrift Pat. No. 3,314,221). The process indicated requires, however, several steps and is restricted to silicon carbide bodies, the pore volume of which is substantially filled with metallic silicon. There is also the risk of the inorganic glazing spalling off under a thermal cycling stress. Other processes for sealing of silicon nitride have been described in German Auslegeschrift Pat. No. 2,635,167 and German Offenlegungsschrift Pat. No. 2,351,162. In this case, the disadvantage is that the silicon nitride must once more be heated to high temperatures. Ceramic heat exchangers can be designed, for example, as counter-current heat exchangers, especially for the exchange of quantities of heat between gaseous and liquid media. They can also be designed as crossflow heat exchangers, especially for heat exchange between gaseous media. The free cross-sections are in general about 0.8–10 mm, preferably 1.6 to 4.8 mm.

It was therefore the object to find a process, by means of which it is possible to seal ceramic heat exchangers of the most diverse geometry, especially those having narrow free cross-sections, and which does not have the disadvantages of the state of the art. This process should in particular enable heat exchangers of $Si_3N_4$ or SiC to be sealed.

A process for sealing ceramic heat exchangers, in particular of silicon nitride, has now been found which comprises filling one side (which later will be the cold side) of the heat exchanger with a liquid synthetic resin and generating there a pressure higher than that on the other side (which later will be the hot side) of the heat exchanger, removing the excess resin and fully curing the synthetic resin. It is then preferred to apply a vacuum to that side of the heat exchanger which later will be the hot side. It is also possible to fill the cold side with silicone resin and to apply to it a pressure of up to 2 bar and to maintain this pressure for some time without applying vacuum to the other side.

If the heat exchanger to be sealed consists of silicon nitride and the cross-sections are narrow (less than 2 mm) it is advantageous mechanically to remove the silicon nitride whiskers, formed on reaction firing, before the treatment with synthetic resin, in order to improve the through-flow capacity. For this purpose, a suspension of abrasive is pumped through the exchanger for a period of about 30 to 240 minutes. A slight positive pressure of up to 0.5 bar is advantageous in this case. The abrasives content of the suspension, especially of silicon carbide, is 5 to 20% by weight. In order to prevent settling of the abrasive, it is appropriate to add an agent which increases the viscosity of the suspension, for example sodium alginate or ammonium alginate in quantities of up to 1.5 % by weight.

Alumina, boron carbide, quartz and especially silicon carbide can be used as the abrasive. These compounds should preferably be in a finely dispersed form, especially in the form of powders having grain sizes of at most 0.5 mm.

After the mechanical cleaning, the heat exchanger is washed with water and dried at temperatures of up to 300° C. The mechanically cleaned side (which later will be the cold side) of the heat exchanger is filled with liquid synthetic resin, and vacuum is applied to the other side or a positive pressure is applied to the synthetic resin side. However, the application of vacuum during impregnation has advantages in working technique.

The synthetic resin used is advantageously a silicone resin, especially a methylsiloxane resin. For example, silicone resins having dimethylsiloxane groups or phenylmethylsiloxane groups can be used. These resins can be cured catalytically or oxidatively by raising the temperature. It is preferred for the resins used to be initially mobile and to solidify only after penetration into the porous wall structure.

Aqueous solutions of potassium or sodium methylsiliconate can also be used. In this case, curing after penetration into the porous wall can be accomplished by the action of acid (for example carbonic acid from the air).

The silicone resin can also contain 0 to 15, preferably 2–12% by weight of zinc dust or aluminum dust. As a result of this addition, the corrosion resistance is enhanced and the water vapor permeability of the silicone resin is reduced. Advantageously, the synthetic resin is thermally cured in stages. The resulting heat exchangers are tight as a result of the resin treatment, unless there are coarse leaks, and they can be thermally stressed on the hot side within the range of the heat stability of the material, without thermal decomposition of the resin. A temperature of 250° C. should not be exceeded on the cold side. The mechanical properties are also improved by the treatment with resin. Other ceramic articles, which can be subjected to vacuum or pressure on at least one side, for example, plates or pipes, can also be sealed by the process indicated, provided that the articles are later not exposed to unduly high temperatures. The invention is explained in more detail by the example.

EXAMPLE

Through a heat exchanger of $Si_3N_4$ (258×16×145 mm; 23 cold channels, 22 hot channels; plate distance 1.6 mm), a suspension of 12% by weight of SiC (SiC grain size 0.1–0.2 mm) in an aqueous 0.2% Na-alginate solution is pumped at a positive pressure of 0.4 bar for 200 minutes through that side of the heat exchanger which later will be the cold side. For this purpose, a hose pump is connected via seals adapted to the apertures (of the side which later will be the cold side) of the heat exchanger. This has the result that there is uniform flow through all the channels and the $Si_3N_4$ whisker covering is removed from all the channels.

Washing with distilled water is then carried out until the abrasive suspension has been completely removed. During this washing, the direction of flow is changed. The heat exchanger is then dried for several hours at 150°–300° C.

The silicone resin/Zn suspension (8% by weight of Zn) used for impregnation is ground for 12 hours in a ball mill with $Al_2O_3$ balls for homogeneous dispersion and further comminution of the Zn powder. The grain size is then less than 60 μm.

Vaccum is then applied to the dried heat exchanger on the side which later will be the hot side, and the impregnating solution obtained is pumped for 30 minutes through the side which later will be the cold side. Here again, uniform flow through all the connected channels is ensured.

After removal of the excess resin, the heat exchanger is placed into a drying cabinet and the resin is fully cured at 250° C. The treated internal surface of the heat exchanger is coated with a layer which is up to 30mm thick and which contains all the zinc and is anchored in the pores of the ceramic.

The gas permeability of the untreated heat exchanger was $10^{-6}$ kg of air/second×cm² at a differential pressure of 1 bar. Under the same conditions, the gas permeability of the sealed heat exchanger was $10^{-6}$ kg of air/second×cm².

We claim:

1. A process for sealing a ceramic heat exchanger having narrow cross-sections, which comprises filling the cold side of the heat exchanger with a liquid synthetic resin and generating there a pressure higher than that on the hot side of the heat exchanger, removing the excess resin and fully curing the synthetic resin.

2. The process as claimed in claim 1 wherein the ceramic heat exchanger consists of silicon nitride.

3. The process as claimed in claim 1 wherein the synthetic resin is a silicone resin.

4. The process as claimed in claim 3, wherein the silicone resin is a methylsiloxane resin.

5. The process as claimed in claim 3, wherein the silicone resin contains zinc dust.

6. The process as claimed in claim 1, wherein the synthetic resin is cured thermally.

7. The process as claimed in claim 2, which comprises pumping, before the treatment with the liquid synthetic resin, a suspension of finely dispersed abrasive in a liquid phase through the cold side, until the silicon nitride whiskers formed on reaction firing have been mechanically removed, and rinsing and drying the heat exchanger.

8. The process as claimed in claim 7, wherein the suspension also contains an agent for increasing the viscosity.

9. The process as claimed in claim 7, wherein the abrasive used is finely dispersed silicon carbide.

10. The process as claimed in claim 9, wherein the particles of the silicon carbide suspension have a size of at most 0.5 mm.

11. The process as claimed in claim 1, wherein, after the resin has been filled in, vacuum is applied to the the hot side of the heat exchanger.

* * * * *